United States Patent Office 2,726,708
Patented Dec. 13, 1955

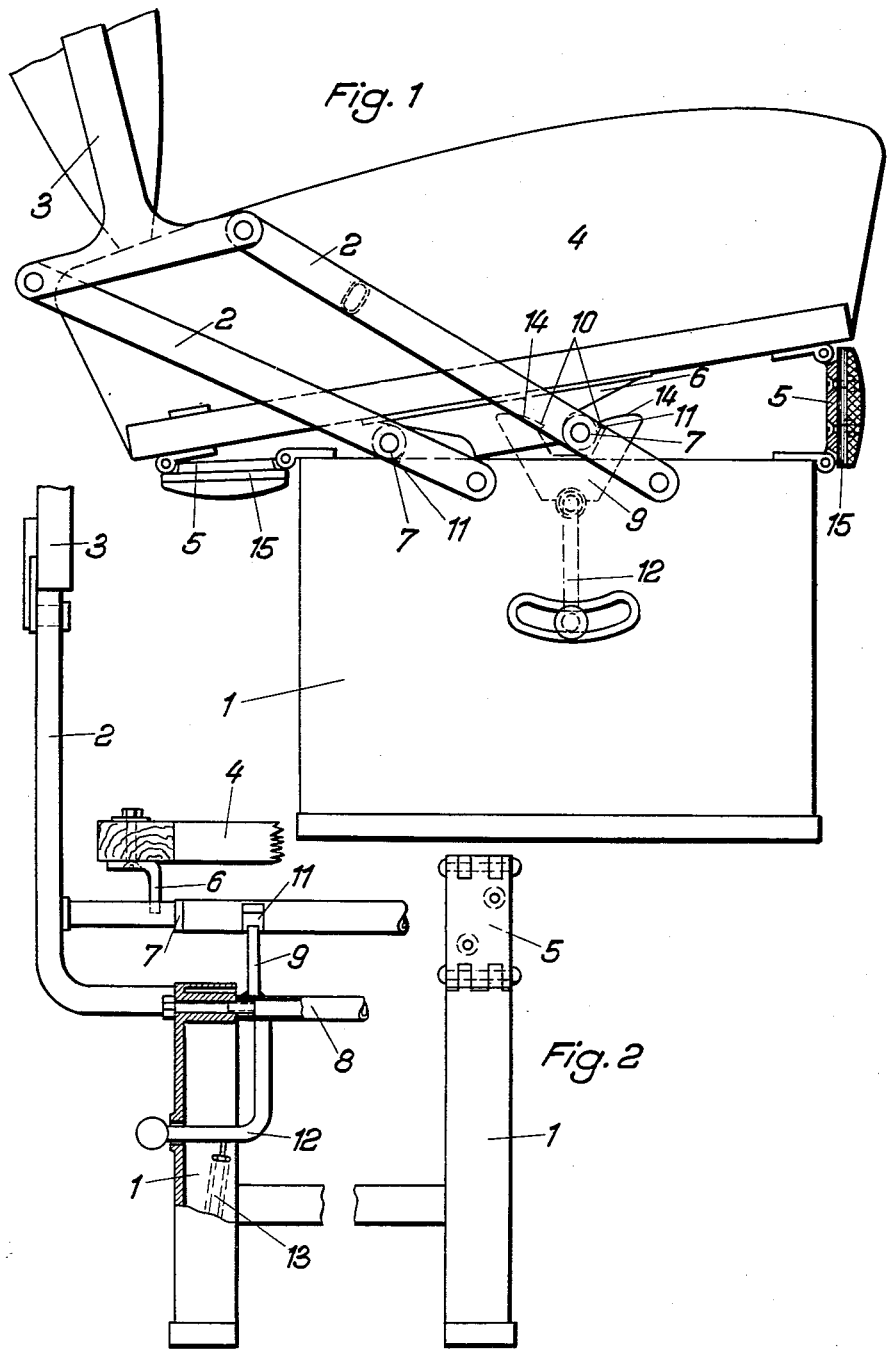

2,726,708

REVERSIBLE SEAT STRUCTURE

Karl Heinz Eickhorn, Solingen-Ohligs, and Alfred Langer, Hilden Rhineland, Germany, assignors to Bremshey & Co., Solingen-Ohligs, Germany Application September 10, 1952, Serial No. 308,766

Claims priority, application Germany September 14, 1951

8 Claims. (Cl. 155—101)

The invention relates to a reversible seat structure and relates more particularly to railroad seats of the type that can be turned about so that the passenger will always be able to face in the direction of travel.

Desirable features for seats of this type include easy reversibility, and symmetrical arrangement of the seats in respect of either direction, and these features are generally found in reversible railroad seats now in use. However, present seats of this type are deficient in that they do not provide for locking of the seat structure in either position, so that during abrupt changes of speed the back rest may sometimes be impelled from its rest position towards the opposite position, particularly if during sudden stops the passengers to the rear of the seat are catapulted against the back rest of the seat before them, with consequent discomforts experienced by the occupants of the latter.

The instant invention has among its objects to avoid the drawbacks inherent in the seats of the prior art, and to provide for a seat structure that can be releasably locked in either extreme seating position, and easily released when desired.

With the above and other objects of the invention in view, the invention consists in the novel construction, arrangement and combination of various devices, elements and parts, as set forth in the claims hereof, one embodiment of the same being illustrated in the accompanying drawings and described in the specification.

In the accompanying drawings,

Fig. 1 is a fragmentary side elevational view, partly in section, showing a reversible seat structure in accordance with the invention;

Fig. 2 is a fragmentary front elevational view, partly in section, of the seat structure shown in Fig. 1.

The seat structure comprises a support 1 that has ground engaging means, such as a lower platform, to rest on the floor of a vehicle such as a railroad car. The support 1, as best shown in Fig. 2, may be composed of two spaced brackets that are interconnected by interconnecting bars to provide for a rigid base or support.

A seat, generally indicated at 4, is secured above the support 1, and is pivoted to the support 1 at the ends thereof, by means of a plurality of, for instance four, double hinges, each generally indicated at 5. Each hinge 5 comprises two small parts, one being secured to the support 1 and the other to the underside of the seat 4, and a connecting part therebetween and the two opposite connecting parts at the ends of the seat 4 may, for purposes of embellishment, be provided on the exterior with upholstering 15 to conceal the space between the seat 4 and the support 1. For example, the direction of travel in Fig. 1 is assumed to be from left to right, and therefore the left double hinges 5 are disposed horizontally, whereas the right double hinges 5 are vertical, elevating the knee supporting section of the seat 4, and providing the seat 4 with an inclination at an angle to the horizontal in its extreme positions, upwardly in the direction of travel.

When the seat is being reversed, the right hand hinges 5 will be horizontal and, conversely, the left hand hinges will be vertical, imparting to the seat in the other extreme position an opposite inclination, symmetrical to that shown in Fig. 1. The hinges 5 thus guide the seat 4 between the opposite extreme positions.

A back rest 3 is provided for the seat 4, and this back rest 3 is interconnected to the support 1 by means of pairs of links 2, one pair being formed on each side of the seat 4, but independent thereof. Each link 2 is pivoted to the support, symmetrically of the center section of the support 1, one to the right and one to the left of a latch 12, and each link pivot on the support 1 is spaced from that latching means 12 for an equal distance. The upper portions of the links 2 are pivoted to the lower end of the back rest 3. The back rest 3 is of the double-sided type, having on both sides upholtsering so that it can act as a back rest either in the left hand position shown in Fig. 1 or in the symmetrical opposite right hand position (not shown). Each of the links 2 is interconnected to the respective opposite link on the other side of the seat by means of an element, such as a rod 7 which traverses the space underneath the seat 4. Each of these elements 7 is movable with its links about the pivot axis thereof on the support, describing an arcuate path about the axis of its links, between an outward position (shown for the left hand link 2 in Fig. 1), and a central position (shown for the right hand link 2) wherein the element 7 is engaged by the latching means 12.

The seat 4 is provided at its underside with a member 6 that has two opposite cam portions, and each cam portion forms a surface that near the underside of the seat 4 is inclined downwardly towards the center and is bent and terminates in a portion substantially perpendicular to the underside of the seat 4. Each element 7 defines a cam follower for one of the cam surfaces of the member 6, and provides a rest for the seat in one position; for instance, the left hand element 7 provides the support at rest for the left hand inclined cam surface portion in the position shown in Fig. 1.

A rightwardly directed pressure exerted against the back rest 3 in the exemplified position shown in Fig. 1 will cause movement of the back rest 3 from the left hand side of the seat 4 towards the right hand side thereof, about the pivots of the links 2 on the support 1 assuming a status of latch release explained below. During the movement of the back rest 3, the links 2 will describe arcuate paths, and will take along in this movement the elements 7. In the exemplified portion of Fig. 1, the left hand element 7 will first exert an upwardly directed pressure against its inclined cam surface; sliding thereon, and will elevate the left hand portion of the seat 4; when the left hand element 7 has reached the bend and the perpendicular portion of its cam face of the member 6, it will then stay on that portion and exert a horizontal rightward push against the member 6, thereby bringing the left hand hinge 5 to vertical position and tilting the right hand hinge 5 into horizontal position, thereby pushing the seat rightwardly and shifting its inclination, thus reversing the seat 4 from one extreme position (Fig. 1) to the opposite extreme position. Finally, the right hand cam of the member 6 will come to rest on the right hand element 7.

A reversing of the seat necessitates that the lower seat section first be raised, which is difficult, if not impossible, when a person is sitting on the seat as the weight of the person will be exerted against the lower seat section next to the back rest. The hinges 5 thus provide for good locking against accidental reversing.

Latching means are furthermore provided to latch the seat structure positively in either extreme position. The latching means comprise the latch 12 which includes a hollow tube 8 that is journalled on a pivot shaft which is secured to the support 1; by this arrangement, the latch 12 is pivoted relative to the support 1, and is tiltable angularly in opposite directions, about the axis of the tube 8, from a normal position shown in Fig. 1. The latch 12 includes a bifurcated part 9 that has two side portions spaced from each other symmetrically about the center of the latch 12 when the latter is in normal position. Each side portion is provided with an inclined outwardly flaring upper surface 14 that may be curved, and which intersects at an acute angle the arcuate path of an element 7 of the links 2 nearest to it, and is provided on the interior with a hook 10. Each element 7 has a lug 11 operable to engage a hook 10 of the latch 12 when the latter is in the center latching position. The lug 11 engages the hook 10 radially of the tube 8, so that an element 7, when the latch 12 is in the center position and a lug 11 is in latching engagement with the underside of the hook 10, cannot exert any tilting moment against the latch 12, if force is applied to the link 2 trying to rotate the same outwardly in an attempt to disengage the latching means before release thereof.

A spring 13 is connected between the support 1 and the latch 12 to hold the latter resiliently in the normal position shown in Fig. 1.

As explained in the foregoing, no accidental unlatching is possible, owing to the position of the lower faces of the hooks 10 in the normal position of the latch 12. On the other hand, when an element 7 moves from the outward position towards the center position, the element will, owing to the intersection of its path with the curved surface 14 make impact therewith and will tilt the latch 12 in a direction towards the axis of the links 2 of that element 7 by depressing the curved surface 14 so that it can pass to the center position; thereafter, the spring 13 will return the latch 12 to the neutral position thereby latching the element 7.

The latch 12 may be moved out of the normal latching position by manually tilting in either direction the handle thereof that extends to the exterior from the support 1 (see Fig. 2), along an arcuate slot (Fig. 1). Manual tilting of the latch 12 off the normal position, away from the latched lug 11, will remove the hook 10 from its engagement with the lug 11, and will release the element 7 to be pushed, by means of movement of its link 2, from the central to the outward position.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a reversible seat structure, in combination, a support, a seat movable between two extreme positions relative to the horizontal, hinging links interconnecting opposite ends of said seat with said support guiding said seat between said extreme positions, a double-sided back rest connected to said support and being shiftable above said seat to be in either extreme position thereof near an end at the lower section of the upper surface of said seat, whereby the weight of a person sitting on the seat will be exerted against said lower section to restrain accidental seat movement, parallel paired links pivoted to said support and to said back rest for guiding the latter, means actuable between said links and said seat for moving said seat when said links are moved about their pivots by shifting of said back rest, and releasable latching means operable for latching a link relative to said support and including two parts each alternately associated with a link and a part connected to said support and manually operable from the exterior, and means connected to said latching part on said support and operable to maintain the latching part resiliently in latching position.

2. In a reversible seat structure, in combination, a support, a seat movable above said support between two extreme inclined positions relative to the horizontal, hinging links interconnecting opposite end of said seat with said support guiding said seat between the extreme positions, a double-sided back rest connected to said support and being movable above said seat in opposite directions, parallel links disposed on the sides of said seat and independent thereof and pivoted to said support and to said back rest for guiding the latter, an element connected intermediate each two opposite links and extending across the underside of said seat and movable with said links, a member connected to the underside of said seat and having two cam surfaces, each engageable by an element, said cam surfaces including oppositely disposed inclined portions terminating in parallel portions substantially perpendicularly to the seat, whereby an element engaging its cam surface will first slide along the inclined portion thereof and come to rest against the parallel portion thereof to elevate the lower section of the seat from one inclined position and thereafter push it into the other inclined position, when said back rest is moved in one of its directions.

3. In a reversible seat structure, in combination, a support, a seat movable above said support between two extreme inclined positions relative to the horizontal, hinging links interconnecting opposite ends of said seat with said support guiding said seat between the extreme positions, a double-sided back rest connected to said support and being movable above said seat in opposite directions, parallel links disposed on the sides of said seat and independent thereof and pivoted to said support and to said back rest for guiding the latter, an element connected intermediate each two opposite links and extending across the underside of said seat and movable with said links, a member connected to the underside of said seat and having two cam surfaces, each engageable by an element, said cam surfaces including oppositely disposed inclined portions terminating in parallel portions substantially perpendicularly of the seat, whereby an element engaging its cam surface will first slide along the inclined portion thereof and come to rest against the parallel portion thereof to elevate the lower section of the seat from one inclined position and thereafter to push it into the other inclined position, when said back rest is moved in one of its directions, and latching means connected to said support and operable to engage in each extreme position of said seat an element, said latching means being tiltable in opposite directions from a normal position, a lug connected to each element and a latch formed on said latching means for each lug operable in the normal position of said latching means for interengagement with a lug to lock an element, each latch being operable to release the lug when said latching means is manually tilted from said normal position, and means connected to said latching means and operable to maintain the same resiliently in said normal position.

4. In a reversible seat structure, in combination, a support, a seat movable between two extreme positions of opposite inclination relative to the horizontal, a double-sided back rest connected to said support and being movable above said seat to be in either extreme position thereof near the lower portion of the upper surface of said seat, shifting means operable to shift said seat from one extreme position to the other when said back rest is being moved from one end of the upper seat surface toward the other including a tiltable mechanism pivoted between said backrest and said support and a cam disposed below said seat and connected thereto and having symmetrically disposed opposite cam portions, each cam portion forming an inwardly, downwardly inclined surface terminating in a terminal surface disposed substantially perpendicularly of the underside of said seat, two elements forming cam followers each disposed below said seat and connected to said tiltable mechanism and guided thereby in an arcuate path between a central position and an outward position, and each engaging a cam portion when turning from the outward position inwardly first sliding along the inclined surface to lift the lower end of the seat and thereafter engaging the perpendicular terminal surface of the cam to push the seat into the opposite extreme position, and a pair of hinging links pivoted along the front and rear of said seat to said support and to said seat interconnecting said seat to said support and guiding the seat between the extreme positions.

5. In a reversible seat structure having a support, a movable seat, hinge means guiding said seat between two opposite end positions above said support, a double-sided backrest movable between opposite corresponding end positions and supported by tiltable links pivoted to said support on opposite sides thereof, and driving means intermediate said links and said seat for moving said seat when said links and said backrest are being moved between end positions, said driving means comprising a cam structure connected to the underside of said seat and having two symmetrically arranged downwardly converging opposite inclined cam surfaces terminating in parallel surfaces substantially at right angles to the base of said seat, and a cam follower for each cam connected between opposite links and disposed intermediate the seat and the pivots of the links at the support, and movable in an arcuate path about the pivots of said links to the support and operable to engage an inclined cam surface slidingly during a portion of the backrest movement between end positions and to abut against the parallel surface thereof during the remainder of said movement, the opposite cam follower supporting the opposite inclined cam surface after termination of said movement in the corresponding end position and the angle of inclination of said cam surface being so arranged whereby in either end position an inclined cam surface will rest on a cam follower for maintianing by gravitational action the seat and backrest in said end position, said action being subject to increase by the weight of a person sitting on said seat, said support being in supporting engagement with the supporting cam follower in each end position.

6. In a reversible seat structure having a support, a movable seat, hinge means guiding said seat between two opposite end positions above said support, a double-sided backrest movable between opposite end positions and supported by tiltable links pivoted to said support on opposite sides thereof, and driving means intermediate said links and said seat for moving said seat when said links and said backrest are being moved between end positions, said driving means comprising a cam structure connected to the underside of said seat and having two symmetrically arranged downwardly converging opposite inclined cam surfaces terminating in parallel surfaces substantially at right angles to the underside of said seat, and a cam follower for each cam connected between opposite links and movable in an arcuate path about the pivots of said links to the support and operable to engage an inclined cam surface slidingly during a portion of the backrest movement and to abut against the parallel surface thereof during the remainder of said movement.

7. In a reversible seat structure, as claimed in claim 6, together with, latching means comprising a projection on each cam follower, and a releasable latch operable to engage in each end position a cam follower projection.

8. In a reversible seat structure, as claimed in claim 6, together with, said hinge means comprising two double hinge elements each connecting one end edge of the seat to an end edge of the support, and a cover on each hinge for concealing the underside of said seat.

References Cited in the file of this patent

UNITED STATES PATENTS

| | | |
|---|---|---|
| 615,227 | Picklets | Nov. 29, 1898 |
| 1,252,748 | Walker | Jan. 8, 1918 |